(12) United States Patent
Miki et al.

(10) Patent No.: US 11,319,019 B2
(45) Date of Patent: May 3, 2022

(54) SADDLE RIDING VEHICLE

(71) Applicant: HONDA MOTOR CO., LTD., Tokyo (JP)

(72) Inventors: Sosuke Miki, Asaka (JP); Shinya Matsumoto, Asaka (JP); Naohiro Ashida, Asaka (JP)

(73) Assignee: HONDA MOTOR CO., LTD., Tokyo (JP)

( * ) Notice: Subject to any disclaimer, the term of this patent is extended or adjusted under 35 U.S.C. 154(b) by 99 days.

(21) Appl. No.: 16/860,774

(22) Filed: Apr. 28, 2020

(65) Prior Publication Data
US 2020/0391821 A1 Dec. 17, 2020

(30) Foreign Application Priority Data

Jun. 13, 2019 (JP) .............................. JP2019-110683

(51) Int. Cl.
  *B62M 9/02* (2006.01)
  *B62M 23/00* (2006.01)
  *B62M 11/02* (2006.01)
(52) U.S. Cl.
  CPC .............. *B62M 9/02* (2013.01); *B62M 11/02* (2013.01); *B62M 23/00* (2013.01)
(58) Field of Classification Search
  CPC .......... B62M 9/00; B62M 9/02; B62M 11/02; B62M 23/00; B62M 21/00; F16F 15/12; F16H 55/14; F16H 2055/306
  See application file for complete search history.

(56) References Cited

U.S. PATENT DOCUMENTS

| 3,747,720 | A | * | 7/1973 | Jensen | ..................... B62M 9/00 180/219 |
| 4,328,879 | A | * | 5/1982 | Tone | ....................... F16H 55/14 180/219 |
| 4,486,183 | A | * | 12/1984 | Posiviata | .................. F16D 3/68 267/148 |

(Continued)

FOREIGN PATENT DOCUMENTS

| JP | 58-64596 | 4/1983 |
| JP | 2017-217941 A | 12/2017 |
| JP | 2017217941 | * 12/2017 |

OTHER PUBLICATIONS

Japanese Office Action with English translation dated Apr. 20, 2021, 7 pages.

*Primary Examiner* — Minnah L Seoh
*Assistant Examiner* — Michael R Stabley
(74) *Attorney, Agent, or Firm* — Rankin, Hill & Clark LLP

(57) ABSTRACT

In a saddle riding vehicle including: a sprocket driven by a power transmission member; a sprocket support member that supports the sprocket and that is connected with a wheel; a damper member that is housed in a recessed portion in a hub of the wheel and disposed between the hub and the sprocket support member, the damper member being deformed through a relative rotation between the hub and the sprocket support member; and a resistance mechanism that dampens the relative rotation between the hub and the sprocket support member, the sprocket support member includes an extension portion that covers an outer periphery of the hub from an outside in a radial direction, and the resistance mechanism is disposed between an inner periphery of the extension portion and the outer periphery of the hub.

8 Claims, 7 Drawing Sheets

(56) References Cited

U.S. PATENT DOCUMENTS

| | | | | |
|---|---|---|---|---|
| 4,794,998 | A * | 1/1989 | Iwai | B62K 25/005 |
| | | | | 180/219 |
| 6,234,127 | B1 * | 5/2001 | Simpson | F16F 15/1204 |
| | | | | 123/192.2 |
| 7,931,538 | B2 * | 4/2011 | Martinek | F16D 3/68 |
| | | | | 464/73 |
| 10,112,677 | B2 * | 10/2018 | Ishii | B62J 99/00 |
| 10,618,592 | B2 * | 4/2020 | Tsuda | B62K 11/04 |
| 10,843,766 | B2 * | 11/2020 | Kogirima | B62K 25/20 |
| 10,927,939 | B1 * | 2/2021 | Hoban | F16D 3/68 |

* cited by examiner

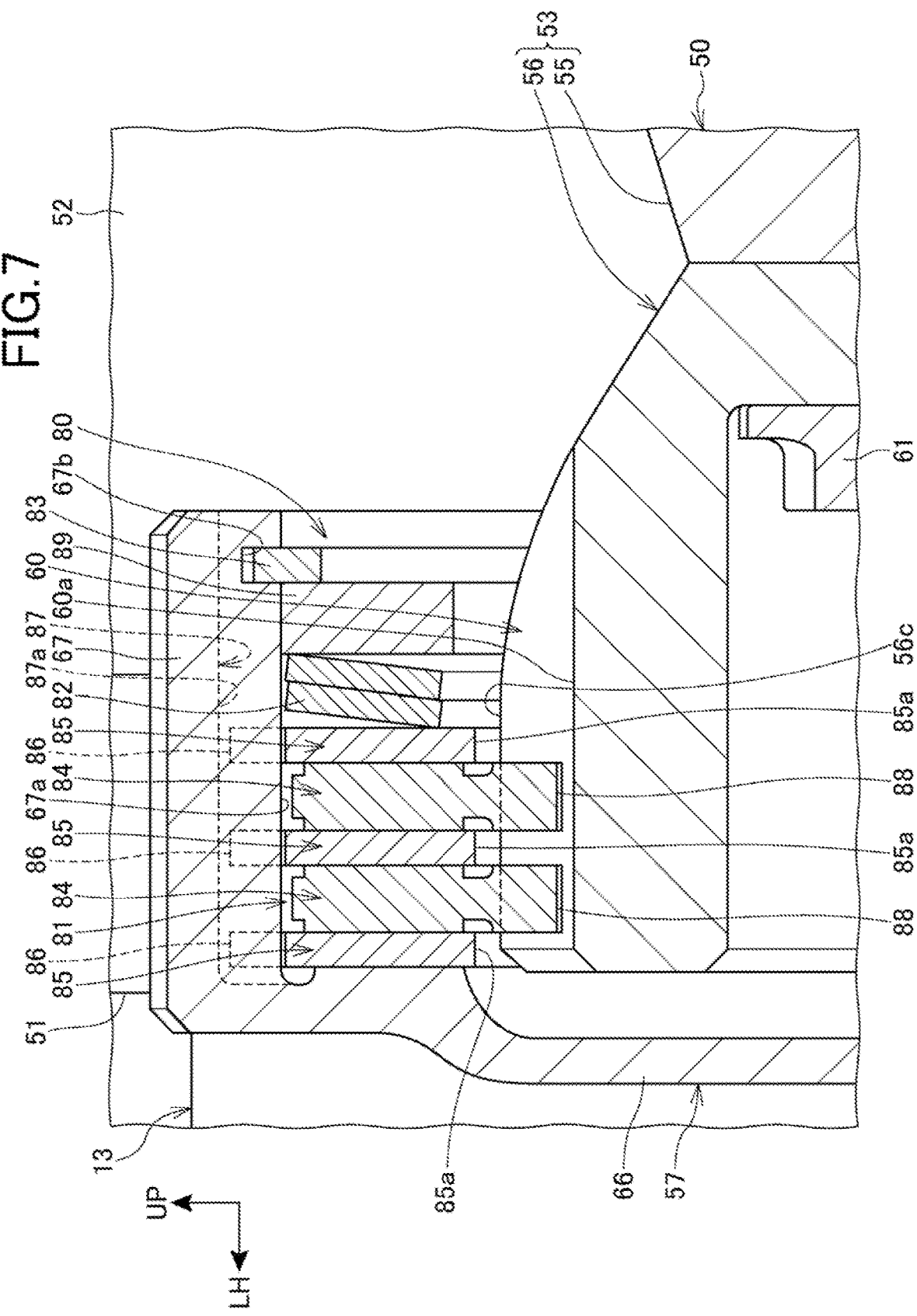

SADDLE RIDING VEHICLE

INCORPORATION BY REFERENCE

The present application claims priority under 35 U.S.C. § 119 to Japanese Patent Application No. 2019-110683 filed on Jun. 13, 2019. The content of the application is incorporated herein by reference in its entirety.

TECHNICAL FIELD

The present invention relates to a saddle riding vehicle.

BACKGROUND ART

A hitherto known saddle riding vehicle includes a power transmission member that transmits a power of a power unit to a wheel of a drive wheel, a sprocket driven by the power transmission member, a sprocket support member supporting the sprocket and connected with the wheel, and a damper member housed in a recessed portion in a wheel hub and disposed between the hub and the sprocket support member, the damper member being deformed through a relative rotation between the hub and the sprocket support member (see, for example, Patent Document 1). The configuration disclosed in Patent Document 1 includes a resistance mechanism that dampens the relative rotation between the hub and the sprocket support member. The resistance mechanism includes a friction plate disposed between the sprocket support member and the hub in an axial direction of the hub.

PRIOR ART DOCUMENT

Patent Document

[Patent Document 1]
Japanese Utility Model Laid-Open No. Sho 58-064596

SUMMARY OF THE INVENTION

Problem to be Solved by the Invention

The known saddle riding vehicle, however, includes the friction plate disposed between the sprocket support member and the hub in the axial direction of the hub. This configuration unfortunately imposes strong restrictions on the number and shape of friction plates, permitting only a low degree of freedom in setting of a damping force by the resistance mechanism.

The present invention has been made in view of the foregoing situation and it is an object of the present invention to improve a degree of freedom in setting of a damping force for a resistance mechanism in a saddle riding vehicle including a damper member disposed in a hub.

Means for Solving the Problem

An aspect of the present invention provides a saddle riding vehicle a power transmission member (33) that transmits a power of a power unit (11) to a wheel (50) of a drive wheel (3); a sprocket (58) driven by the power transmission member (33); a sprocket support member (57) that supports the sprocket (58) and that is connected with the wheel (50); a damper member (59) that is housed in at least one recessed portion (56b) in a hub (53) of the wheel (50) and disposed between the hub (53) and the sprocket support member (57), the damper member (59) being deformed through a relative rotation between the hub (53) and the sprocket support member (57); and a resistance mechanism (80) that dampens the relative rotation between the hub (53) and the sprocket support member (57). In the saddle riding vehicle, the sprocket support member (57) includes an extension portion (67) that covers an outer periphery (56c) of the hub (53) from an outside in a radial direction, and the resistance mechanism (80) is disposed between an inner periphery (67a) of the extension portion (67) and the outer periphery (56c) of the hub (53).

In the foregoing configuration, preferably, the resistance mechanism (80) includes a plurality of friction plates (81) that rotate relative to each other through the relative rotation between the hub (53) and the sprocket support member (57).

In the foregoing configuration, preferably, the plurality of friction plates (81) include hub-side friction plates (84) supported by the hub (53), and sprocket-side friction plates (85) supported by the extension portion (67) of the sprocket support member (57).

In the foregoing configuration, preferably, the hub-side friction plates (84) are supported by outer peripheral side support portions (60) that are provided on the outer periphery (56c) of the hub (53), and the sprocket-side friction plates (85) are supported by inner peripheral side support portions (87) that are provided on the inner periphery (67a) of the extension portion (67).

In the foregoing configuration, preferably, the sprocket-side friction plates (85) and the hub-side friction plates (84) are alternately juxtaposed and the sprocket-side friction plates (85) are greater in number by one than the hub-side friction plates (84).

In the foregoing configuration, preferably, the hub-side friction plates (84) each have a ring shape fitting in the outer periphery (56c) of the hub (53) and each include an inner side tab portion (88) that protrudes from inner peripheral portions (84a) of the hub-side friction plates (84) to an inside in the radial direction, the outer peripheral side support portions (60) each have a groove (60a) that extends in a vehicle width direction and the inner side tab portion (88) engages the groove (60a), and the groove (60a) is open toward the outside in the vehicle width direction.

In the foregoing configuration, preferably, the hub-side friction plates (84) each have a ring shape fitting in the outer periphery (56c) of the hub (53) and each include inner side tab portions (88) that protrude from inner peripheral portions (84a) of the hub-side friction plates (84) to an inside in the radial direction, the outer peripheral side support portions (60) each have grooves (60a), the grooves (60a) being engaged with the inner side tab portions (88), the at least one recessed portion (56b) includes a plurality of recessed portions (56b) that are spaced apart from each other in a circumferential direction of the hub (53) on the inside in the radial direction relative to the outer periphery (56c) of the hub (53), and the grooves (60a) are disposed at positions between respective pairs of the recessed portions (56b) in the circumferential direction of the hub (53).

In the foregoing configuration, preferably, the saddle riding vehicle further includes an urging member (82) disposed between the inner periphery (67a) of the extension portion (67) and the outer periphery (56c) of the hub (53), the urging member (82) urging the friction plates (81) so as to bring the friction plates (81) into tight contact with each other in an axial direction of the hub (53).

In the foregoing configuration, preferably, the urging member (82) is compressed between a clip member (83) that removably engages the inner periphery (67a) of the extension portion (67) and the friction plates (81).

In the foregoing configuration, preferably, the saddle riding vehicle further includes a fixing bolt (68) that fixes the sprocket (58) to the sprocket support member (57). The fixing bolt (68) includes a bolt portion (68a) that protrudes from the sprocket support member (57) to the outside in the vehicle width direction to thereby support the sprocket (58) and a damper abutment portion (68b) that extends into an inside in the recessed portion (56c) and abuts on the damper member (59).

Effects of the Invention

The saddle riding vehicle includes: the power transmission member that transmits the power of the power unit to the wheel of the drive wheel; the sprocket that is driven by the power transmission member; the sprocket support member that supports the sprocket and that is connected with the wheel; the damper member that is housed in the recessed portion in the hub of the wheel and that is disposed between the hub and the sprocket support member, the damper member being deformed through the relative rotation between the hub and the sprocket support member; and the resistance mechanism that dampens the relative rotation between the hub and the sprocket support member. The sprocket support member includes the extension portion that covers the outer periphery of the hub from the outside in the radial direction. The resistance mechanism is disposed between the inner periphery of the extension portion and the outer periphery of the hub.

Through the foregoing configuration, because the resistance mechanism is disposed between the inner periphery of the extension portion of the sprocket support member and the outer periphery of the hub, a degree of freedom in the shape and disposition of the resistance mechanism is high, so that the degree of freedom in setting the damping force of the resistance mechanism can be enhanced.

In the foregoing configuration, the resistance mechanism may include the friction plates that rotate relative to each other through the relative rotation between the hub and the sprocket support member.

Through the foregoing configuration, the friction plates can be disposed with a high degree of freedom between the inner periphery of the extension portion and the outer periphery of the hub. Thus, the friction force of the friction plates can readily be adjusted and the degree of freedom in setting the damping force of the resistance mechanism can be enhanced.

In the foregoing configuration, the friction plates may include the hub-side friction plates that are supported by the hub and the sprocket-side friction plates that are supported by the extension portion of the sprocket support member.

Through the foregoing configuration, friction can be generated through the relative rotation between the hub-side friction plates and the sprocket-side friction plates and the damping force can effectively be generated.

In the foregoing configuration, the hub-side friction plates may be supported by the outer peripheral side support portions that are provided on the outer periphery of the hub and the sprocket-side friction plates are supported by the inner peripheral side support portions that are provided on the inner periphery of the extension portion.

Through the foregoing configuration, the hub-side friction plates and the sprocket-side friction plates can be supported with a simple structure and the resistance mechanism can be built into a compact configuration.

In the foregoing configuration, the sprocket-side friction plates and the hub-side friction plates may be alternately juxtaposed and the sprocket-side friction plates may be greater in number by one than the hub-side friction plates.

Through the foregoing configuration, the sprocket-side friction plates can clamp the hub-side friction plate, so that friction can effectively be generated.

In the foregoing configuration, the hub-side friction plates may each have a ring shape fitting in the outer periphery of the hub and may each include the inner side tab portions that protrude from the inner peripheral portion of the hub-side friction plates to the inside in the radial direction. The outer peripheral side support portions may each have the grooves that extend in the vehicle width direction. The inner side tab portions may engage the grooves and the grooves may be open toward the outside in the vehicle width direction.

Through the foregoing configuration, the inner side tab portions on the inner periphery of the hub-side friction plates can be engaged with the grooves in the outer periphery of the hub from the outside in the vehicle width direction, so that the hub-side friction plates can easily be assembled.

In the foregoing configuration, the hub-side friction plates may each have a ring shape fitting in the outer periphery of the hub and may each include the inner side tab portions that protrude from the inner peripheral portion of the hub-side friction plates to the inside in the radial direction. The outer peripheral side support portions may each have the grooves, the grooves being engaged with the inner side tab portions. The at least one recessed portion may include a plurality of recessed portions and the recessed portions may be spaced apart from each other in the circumferential direction of the hub on the inside in the radial direction relative to the outer periphery of the hub. The grooves may be disposed at positions between respective pairs of the recessed portions in the circumferential direction of the hub.

Through the foregoing configuration, the grooves, which the inner side tab portions engage, are less likely to hinder disposition of the recessed portions. This feature allows the recessed portions to be enlarged, so that the damper member can have an increased volume. The outer peripheral side support portions can be disposed to have a small size in the radial direction of the hub and the hub can be prevented from being built larger.

In the foregoing configuration, the urging member that urges the friction plates so as to bring the friction plates into tight contact with each other in the axial direction of the hub may be disposed between the inner periphery of the extension portion and the outer periphery of the hub.

Through the foregoing configuration, the urging member can be provided in a small amount of space between the inner periphery of the extension portion and the outer periphery of the hub. Additionally, adjusting the setting of the urging member allows the damping force generated through friction can easily be adjusted.

In the foregoing configuration, the urging member may be compressed between the clip member that removably engages the inner periphery of the extension portion and the friction plates.

Through the foregoing configuration, the removal of the clip member provides easy access to the friction plates and the urging member and facilitates adjustments of the damping force. In addition, the friction plates and the urging member can be held by the sprocket support member with the clip member that engages the sprocket support member, so that the resistance mechanism can easily be assembled with the hub.

In the foregoing configuration, the saddle riding vehicle may further include the fixing bolts that fix the sprocket to the sprocket support member. The fixing bolts may each include the bolt portion that protrudes from the sprocket support member to the outside in the vehicle width direction to thereby support the sprocket, and the damper abutment portion that extends into the inside in the recessed portion and abuts on the damper member.

Through the foregoing configuration, because the fixing bolts that support the sprocket include the damper abutment portion, the damper member can be deformed by the fixing bolts. This simplifies the structure.

BRIEF DESCRIPTION OF THE DRAWINGS

FIG. 7 is an enlarged cross-sectional view of parts around a resistance mechanism in FIG. 3.

MODE FOR CARRYING OUT THE INVENTION

Figure 1:
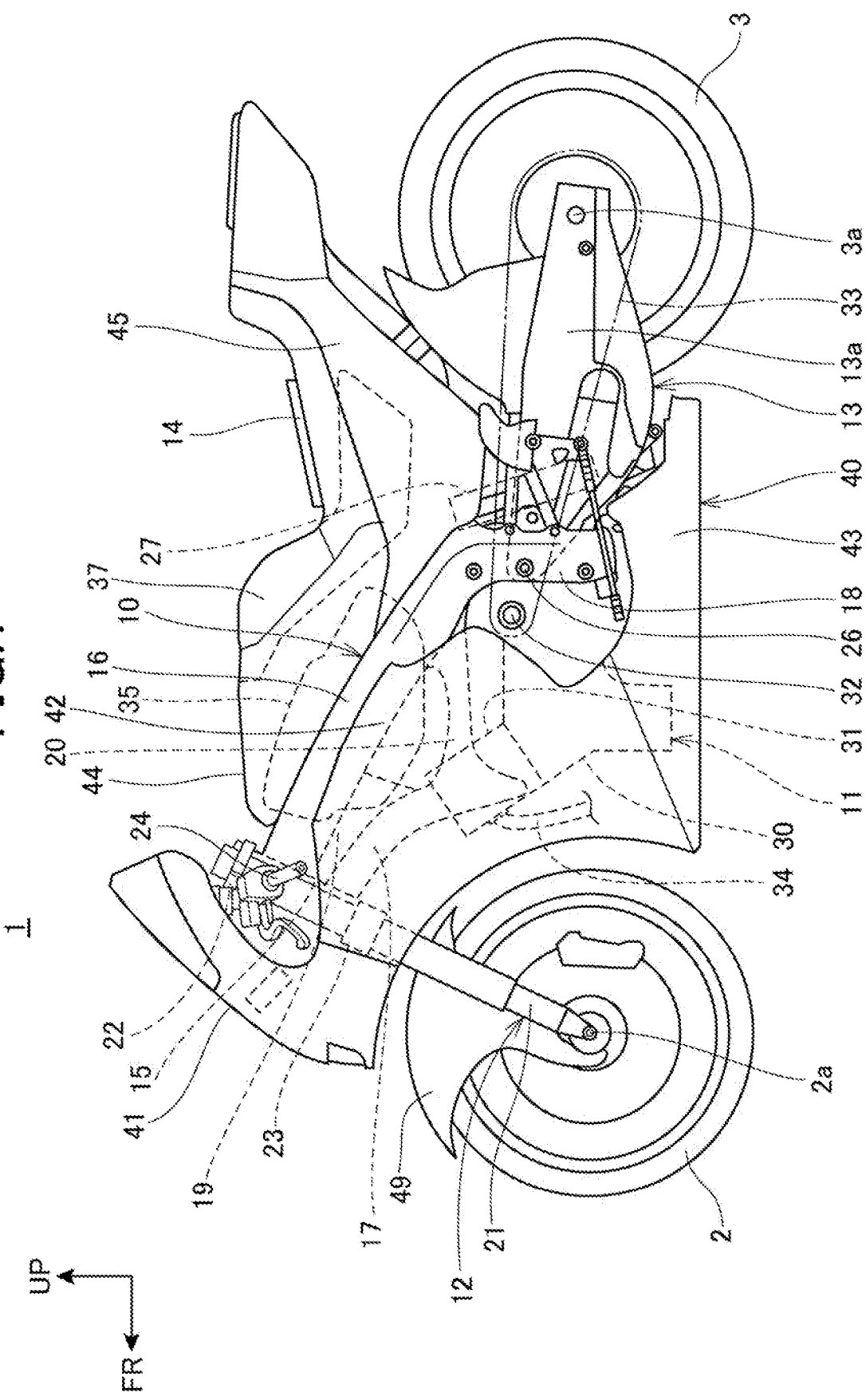
FIG. 1 is a left side elevational view of a motorcycle according to an embodiment of the present invention.

A specific embodiment to which the present invention is applied will be described below with reference to the accompanying drawings. Throughout the descriptions given hereunder, expressions indicating directions including front and rear, right and left, and upper and lower mean the same directions as those in a vehicle body unless otherwise specified. In the drawings, an arrow FR indicates an anterior direction of the vehicle body, an arrow UP indicates a superior direction of the vehicle body, and an arrow LH indicates a leftward direction of the vehicle body.

FIG. 1 is a left side elevational view of a motorcycle 1 according to the embodiment of the present invention.

The motorcycle 1 includes an engine 11, a steering system 12, and a swing arm 13. The engine 11 as a power unit is supported on a vehicle body frame 10. The steering system 12, which steerably supports a front wheel 2, is steerably supported at a front end of the vehicle body frame 10. The swing arm 13, which supports a rear wheel 3, is disposed on a side of a rear portion of the vehicle body frame 10. The motorcycle 1 is a saddle riding vehicle in which an occupant straddles a seat 14. The seat 14 is disposed superior to the rear portion of the vehicle body frame 10. The power unit may be an electric motor.

The vehicle body frame 10 includes a single head pipe 15, a pair of left and right main frames 16, a pair of left and right down frames 17, a pair of left and right pivot frames 18, a pair of left and right seat frames (not illustrated), and a pair of left and right gussets 19. The head pipe 15 is disposed at a center in a vehicle width.

The head pipe 15 is disposed at the front end of the vehicle body frame 10 and supports the steering system 12.

The main frames 16 extend downwardly from an upper portion of the head pipe 15 toward the rear.

The down frames 17 extend from a lower portion of the head pipe 15 downwardly toward the rear.

The pivot frames 18 extend from rear end portions of the main frames 16 downwardly.

The seat frames extend from the rear end portions of the main frames 16 toward the rear to thereby support the seat 14.

The gussets 19 vertically connect front end portions of the main frames 16 with front end portions of the down frames 17. A connection portion 20, which extends in a fore-aft direction, connects lower end portions of the down frames 17 with rear portions of the main frames 16.

The steering system 12 includes a steering shaft (not illustrated), a pair of left and right front forks 21, a top bridge 22, a bottom bridge 23, and a steering handlebar 24. The steering shaft is rotatably journaled by the head pipe 15. The top bridge 22 is fixed to an upper end of the steering shaft and connects upper portions of the left and right front forks 21. The bottom bridge 23 is fixed to a lower end of the steering shaft and connects the left and right front forks 21. The steering handlebar 24 is fixed to upper portions of the front forks 21.

The front wheel 2 is journaled by a front wheel axle 2a which extends across lower end portions of the left and right front forks 21.

A pivot shaft 26, which supports the swing arm 13, extends across the left and right pivot frames 18.

The swing arm 13 includes a pair of left and right arm portions 13a (the arm portion 13a on the right-hand side is not illustrated in FIG. 1) and a cross member (not illustrated). The arm portions 13a each extend in a vehicle fore-aft direction. The cross member connects front portions of the left and right arm portions 13a in a vehicle width direction (left-right direction).

The left and right arm portions 13a have front end portions journaled by the pivot shaft 26, so that the swing arm 13 is vertically swingable about the pivot shaft 26.

A rear wheel axle 3a, which connects rear end portions of the left and right arm portions 13a in the vehicle width direction, is mounted on the swing arm 13. The rear wheel 3 is supported by the rear wheel axle 3a and located between the left and right arm portions 13a.

The swing arm 13 is connected with the vehicle body via a cushion unit 27.

The engine 11 is disposed inferior to the main frames 16 and between the down frames 17 and the pivot frames 18 and supported by the vehicle body frame 10.

The engine 11 includes a crankcase 30 and a cylinder portion 31. The crankcase 30 houses a crankshaft (not illustrated) that extends in the vehicle width direction. The cylinder portion 31 extends from an upper portion of a front portion of the crankcase 30 upwardly.

A transmission (not illustrated) that outputs rotation of the engine 11 with a reduced speed is built in a rear portion of the crankcase 30. The output from the engine 11 is transmitted to the rear wheel 3 by a power transmission member 33. The power transmission member 33 is trained over an output shaft 32 of the transmission and the rear wheel 3. The rear wheel 3 is a drive wheel driven by the engine 11 via the power transmission member 33. The power transmission member 33 is a chain in the embodiment. The power transmission member 33 may instead be a belt.

An exhaust pipe 34 of the engine 11 extends downwardly from an exhaust port in a front surface of the cylinder portion 31. The exhaust pipe 34 further extends along a path inferior to the crankcase 30 toward the rear.

An air cleaner box 35 of an intake system of the engine 11 is disposed superior to the engine 11 and between the left and right main frames 16.

A fuel tank 37 is disposed superior to the rear portions of the main frames 16 and, in the vehicle fore-aft direction, between the seat 14 and the air cleaner box 35.

The motorcycle 1 includes a vehicle body cover 40. The vehicle body cover 40 serves as a vehicle body exterior part covering the vehicle body.

The vehicle body cover 40 includes a front cover 41, a pair of left and right side covers 42, an under cover 43, a cover 44, and a rear cover 45. The front cover 41 covers an upper portion of the steering system 12 and the head pipe 15 from the front. The side covers 42 laterally cover the front portion of the vehicle body frame 10 and left and right sides of the engine 11. The under cover 43 covers the engine 11 and the vehicle body frame 10 from below. The cover 44 covers the air cleaner box 35 from above. The rear cover 45 covers the rear portion of the vehicle body.

A front fender 49 is supported by the front forks 21.

Figure 2:
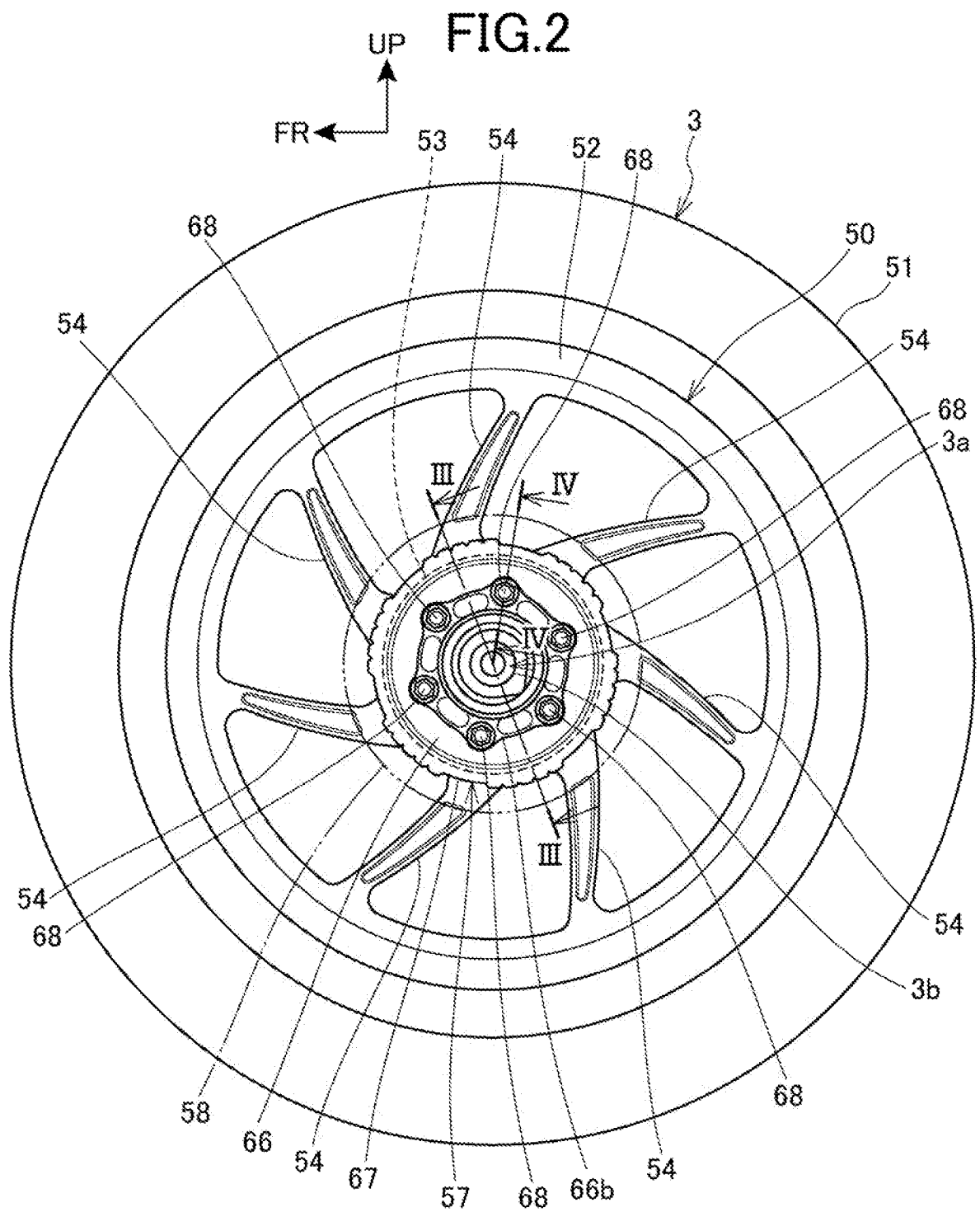
FIG. 2 is a left side elevational view of a rear wheel.

FIG. 2 is a left side elevational view of the rear wheel 3.

The rear wheel 3 includes a wheel 50 and a tire 51. The wheel 50 is supported by the rear wheel axle 3a. The tire 51 is mounted on the wheel 50.

The wheel 50 includes a rim 52, a hub 53, and a plurality of spokes 54. The rim 52 has a circular ring shape in a side view. The hub 53 is disposed at a center of the rim 52. The spokes 54 connect the rim 52 with the hub 53.

The tire 51 is mounted on an outer peripheral portion of the rim 52.

Figure 3:
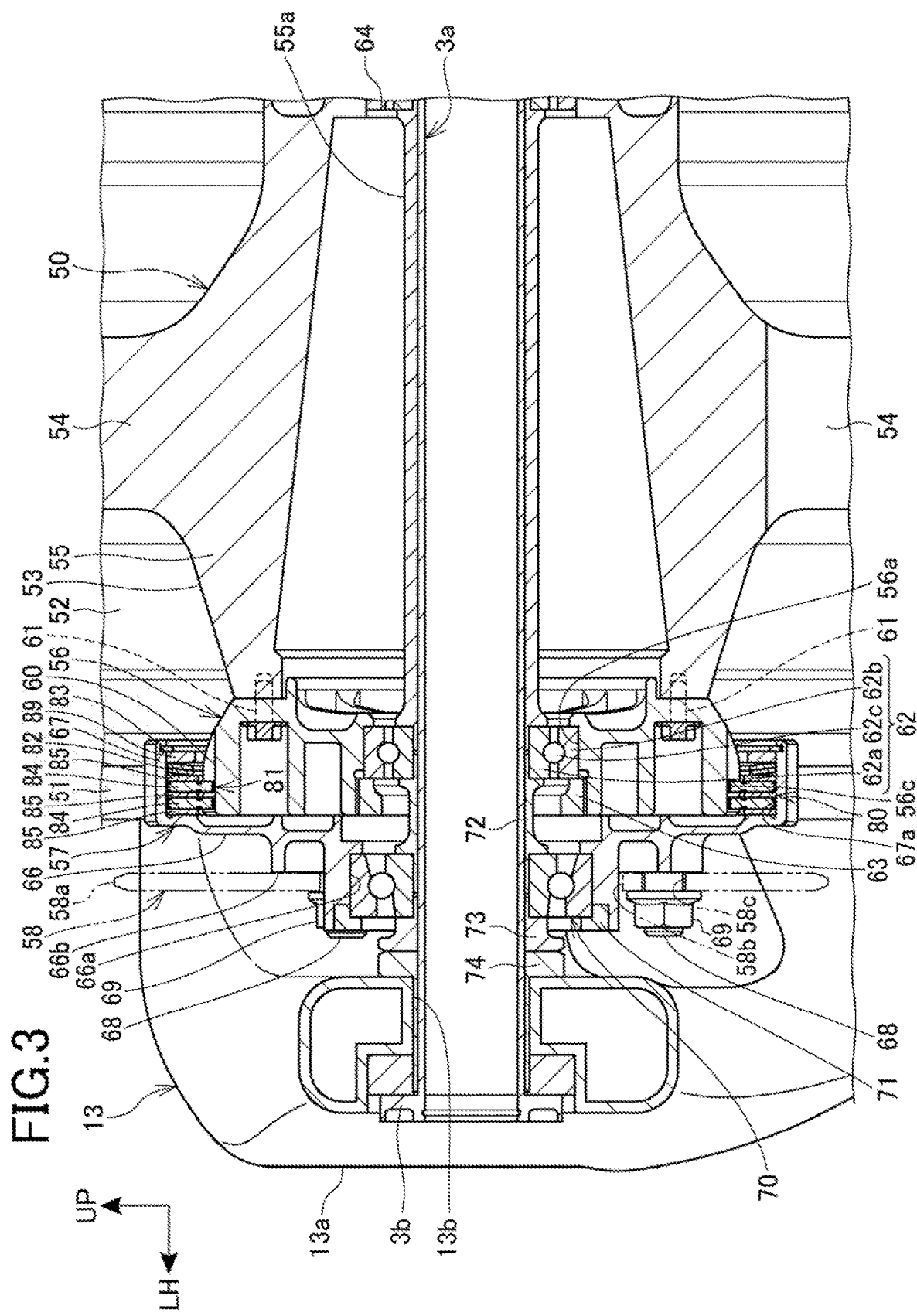
FIG. 3 is a cross-sectional view taken along III-III in FIG. 2.

FIG. 3 is a cross-sectional view taken along III-III in FIG. 2.

Reference is made to FIGS. 2 and 3. The hub 53 is a tubular member extending in the vehicle width direction. The wheel 50 rotates about the rear wheel axle 3a which is passed through the tube of the hub 53.

The hub 53 includes a tubular hub main body 55 and a damper case 56. The hub main body 55 is connected with the rim 52 via the spokes 54. The damper case 56 is fixed to a first side surface (left-hand side surface) in the vehicle width direction in the hub main body 55.

A brake disc (not illustrated) of a brake device for the rear wheel 3 is fixed to a second side surface (right-hand side surface) in the vehicle width direction in the hub main body 55.

A sprocket support member 57 is mounted on an outer lateral surface of the damper case 56. A sprocket 58, with which the power transmission member 33 is connected, is fixed to an outer lateral surface of the sprocket support member 57.

A resistance mechanism 80 is disposed between the sprocket support member 57 and the hub 53. The resistance mechanism 80 dampens relative rotation between the sprocket support member 57 and the hub 53.

Figure 4:
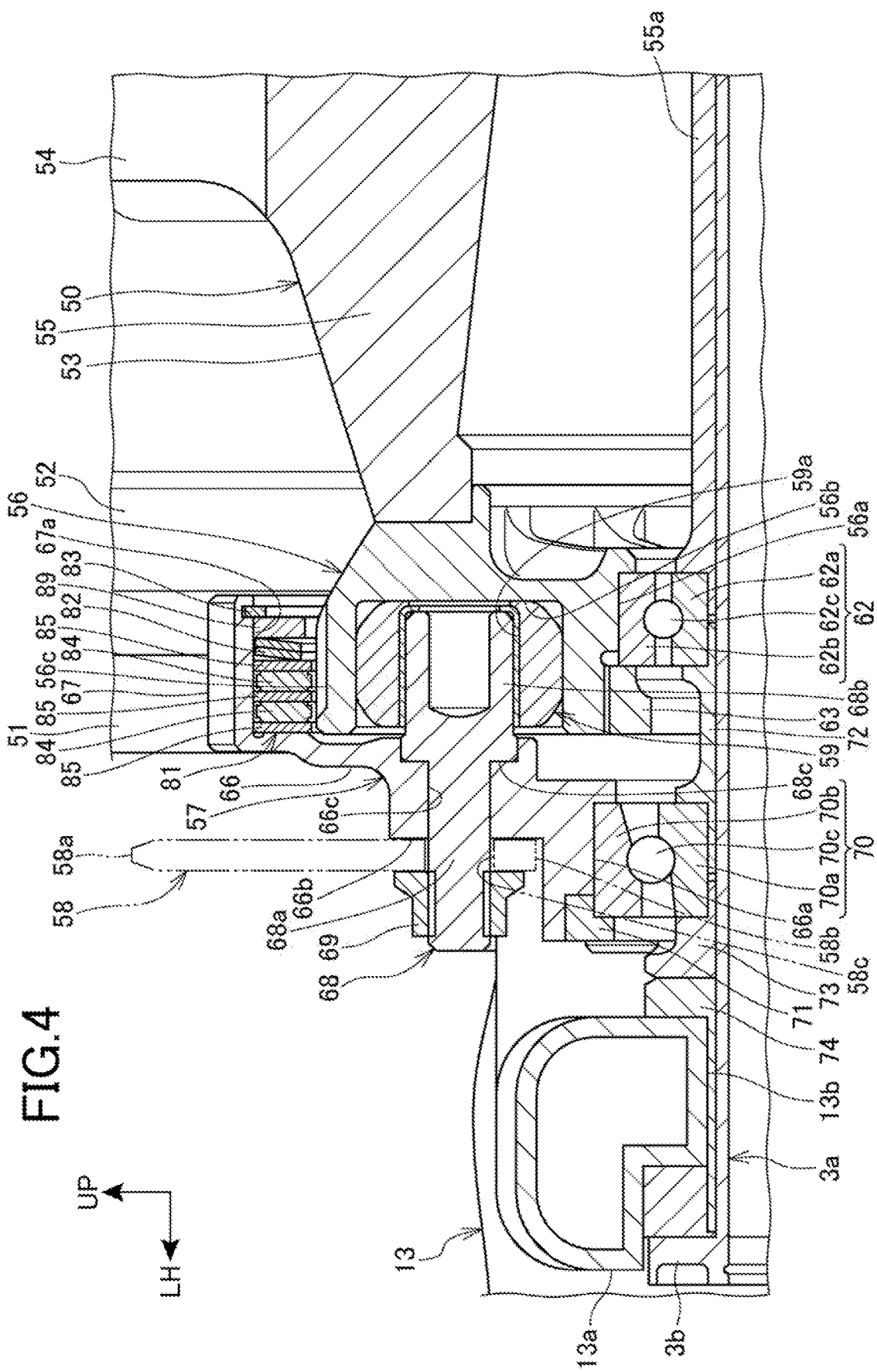
FIG. 4 is a cross-sectional view taken along IV-IV in FIG. 2.
Figure 5:
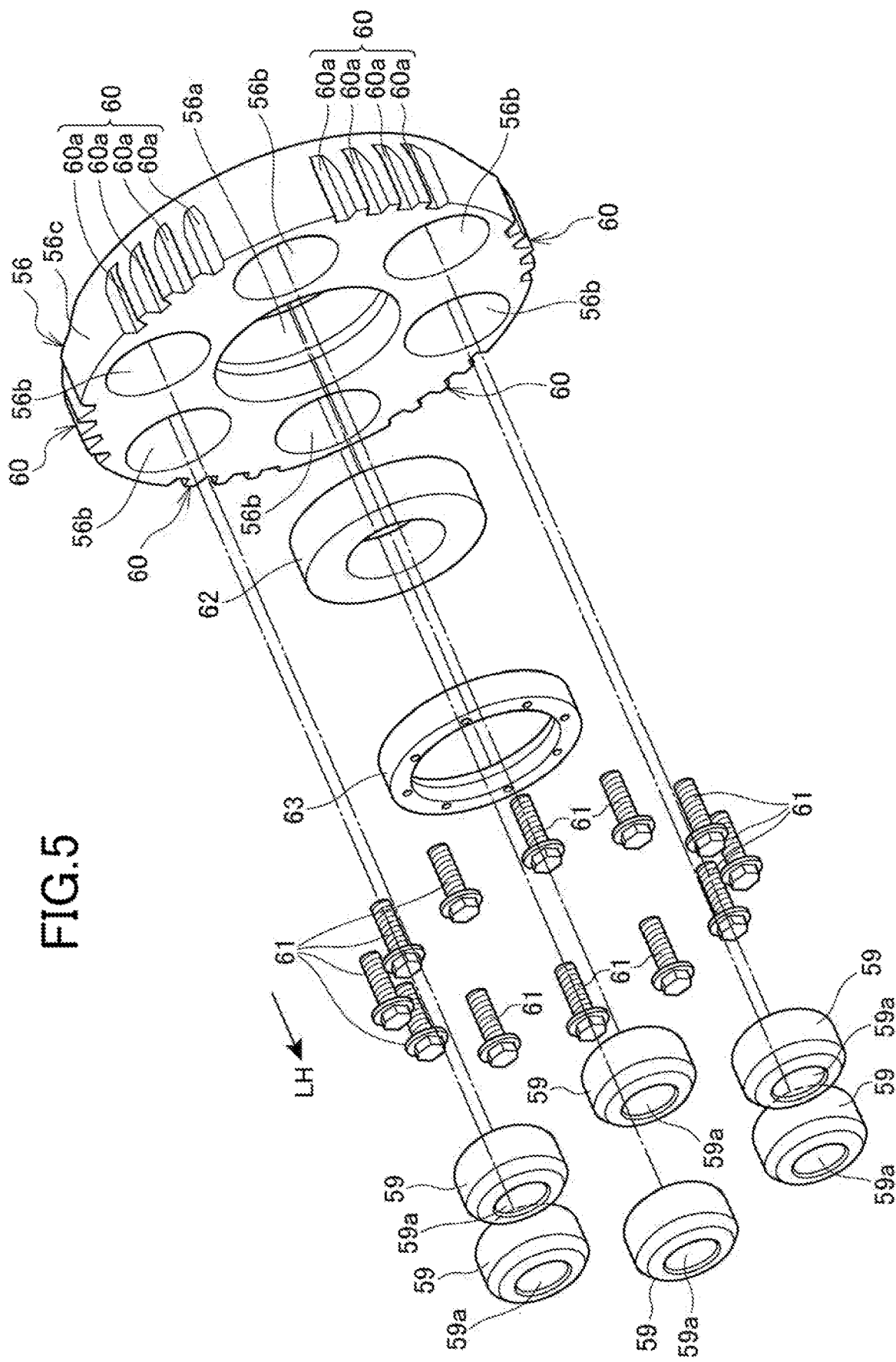
FIG. 5 is an exploded perspective view of a damper case.

FIG. 4 is a cross-sectional view taken along IV-IV in FIG. 2. FIG. 5 is an exploded perspective view of the damper case 56.

Reference is made to FIGS. 3 to 5. The damper case 56 has a disc shape in an axial view of the hub 53 (side view of the vehicle). The axial direction of the hub 53 coincides with an axial direction of the rear wheel axle 3a.

The damper case 56 has a case-side axle hole 56a at a center thereof. The rear wheel axle 3a is passed through the case-side axle hole 56a.

An outer lateral surface in the vehicle width direction of the damper case 56 has a plurality of recessed portions 56b. The recessed portions 56b are recessed toward the inside in the vehicle width direction.

The recessed portions 56b are provided around the case-side axle hole 56a. More specifically, in the axial view of the hub 53, the recessed portions 56b are disposed substantially equidistantly in a circumferential direction of the hub 53 between the case-side axle hole 56a and an outer periphery 56c of the damper case 56. The recessed portions 56b are each a substantially circular hole portion in the axial view of the hub 53 and each open to the outside in the vehicle width direction.

A damper member 59 is housed in each of the recessed portions 56b.

The damper member 59 is an elastomer and, for example, rubber. The damper member 59 has a circular block shape in the axial view of the hub 53 and has a hole portion 59a at a center thereof.

A plurality of outer peripheral side support portions 60 are provided on the outer periphery 56c of the damper case 56.

The outer peripheral side support portions 60 are spaced apart from each other in the circumferential direction of the hub 53 on the outer periphery 56c. More specifically, the outer peripheral side support portions 60 are disposed at positions between respective pairs of the recessed portions 56b in the circumferential direction of the hub 53 and avoiding the recessed portions 56b.

The outer peripheral side support portions 60 each have a plurality of grooves 60a which extend in the vehicle width direction. The grooves 60a are open toward the outside in the vehicle width direction in the axial view of the hub 53.

The damper case 56 is fastened to the outer lateral surface of the hub main body 55 by a plurality of case fixing parts 61. The case fixing parts 61 are passed from the outside in the vehicle width direction through the damper case 56.

A wheel bearing 62 and a retainer 63 are fitted in an inner peripheral portion of the case-side axle hole 56a in the damper case 56. The retainer 63 fixes the wheel bearing 62 in the axial direction.

The wheel bearing 62 includes an inner race 62a, an outer race 62b, and a ball 62c. The inner race 62a is fixed to the side of the rear wheel axle 3a. The outer race 62b is fixed to the case-side axle hole 56a. The ball 62c is disposed between the inner race 62a and the outer race 62b.

A wheel bearing 64 (FIG. 3) is provided on an end portion opposite from the damper case 56 inside the tube of the hub main body 55.

A tube member 55a is disposed inside the tube of the hub main body 55. The tube member 55a correctly positions the wheel bearings 62 and 64 in the axial direction. The tube member 55a abuts on the inner race 62a and an inner race of the wheel bearing 64. The retainer 63 presses the outer race 62b from the outside in the vehicle width direction.

The rear wheel axle 3a is passed through the wheel bearings 62 and 64 and the tube member 55a. The wheel 50 is supported by the rear wheel axle 3a via the wheel bearings 62 and 64.

Figure 6:
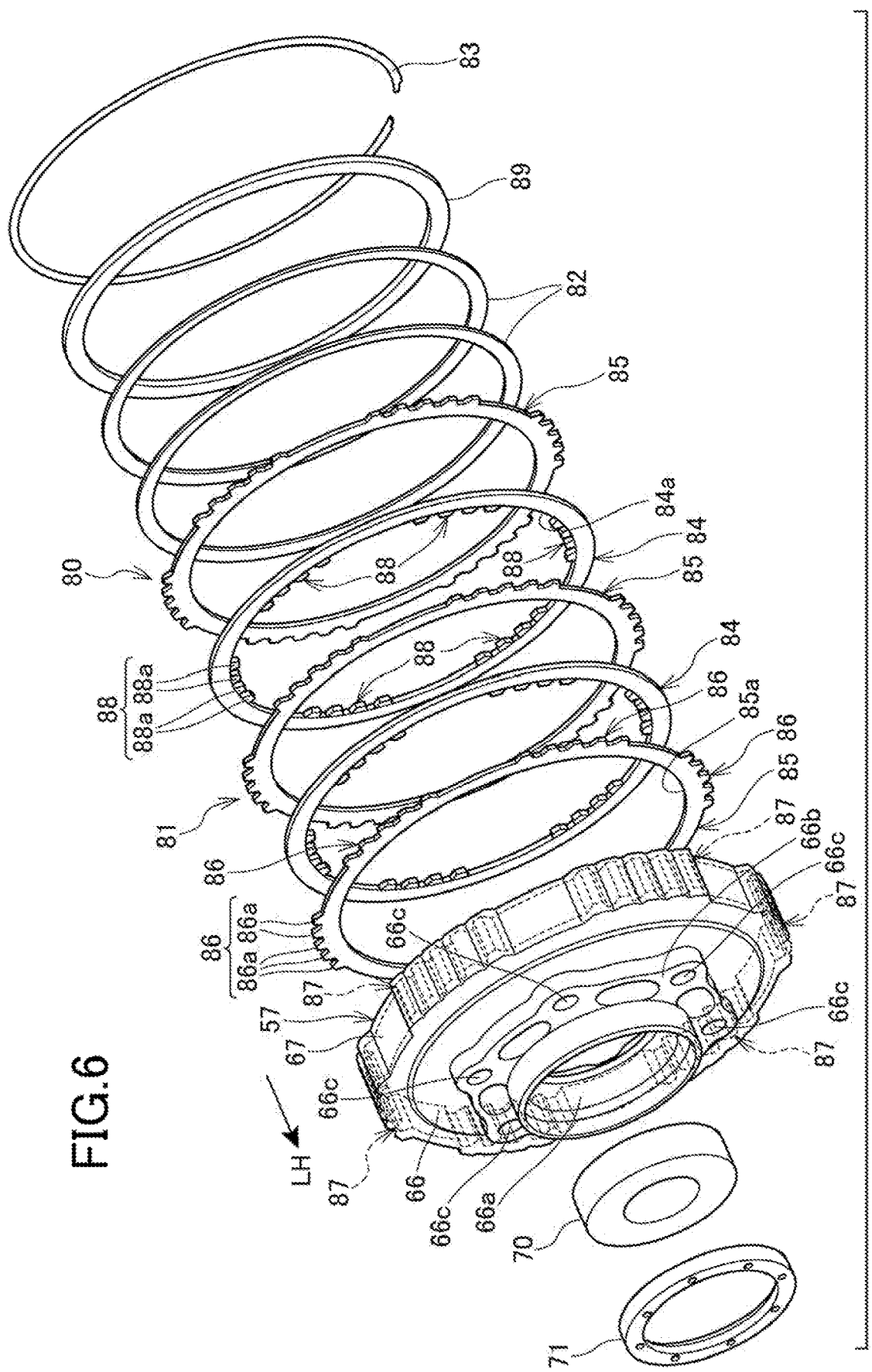
FIG. 6 is an exploded perspective view of a sprocket support member and a resistance mechanism.

FIG. 6 is an exploded perspective view of the sprocket support member 57 and the resistance mechanism 80.

Reference is made to FIGS. 3, 4, and 6. The sprocket support member 57 includes a lateral wall portion 66 and a peripheral wall portion 67 (extension portion). The lateral wall portion 66 has a disc shape as viewed in the axial view of the hub 53. The peripheral wall portion 67 extends from an outer edge in a radial direction of the lateral wall portion 66 toward the inside in the vehicle width direction.

The lateral wall portion 66 has a support member-side axle hole 66a at a center thereof. The rear wheel axle 3a is passed through the support member-side axle hole 66a.

An annular seat portion 66b is provided around the support member-side axle hole 66a on an outer lateral surface of the lateral wall portion 66. The seat portion 66b is shouldered toward the outside in the vehicle width direction. The seat portion 66b has a fixing hole 66c which passes through the lateral wall portion 66 in the vehicle width direction.

The fixing hole 66c is provided in plurality and the fixing holes 66c are disposed substantially equidistantly in the circumferential direction of the hub 53. More specifically, the fixing holes 66c are disposed at positions corresponding to the positions at which the recessed portions 56b (FIGS. 4 and 5) of the damper case 56 are disposed. In the axial view of the hub 53, the fixing holes 66c overlap the respective recessed portions 56b from the outside in the vehicle width direction.

A fixing bolt 68 (FIG. 4) is mounted in each of the fixing holes 66c. The fixing bolt 68 fixes the sprocket 58 to the sprocket support member 57.

The fixing bolt 68 includes a bolt portion 68a and a damper abutment portion 68b. The bolt portion 68a is passed into the fixing hole 66c from the inside in the vehicle width direction and protrudes from the fixing hole 66c to the outside in the vehicle width direction. The damper abutment portion 68b extends into the inside in the recessed portion 56b of the damper case 56 and abuts on the damper member 59.

The damper abutment portion 68b is a shaft-shaped portion having a diameter greater than diameters of the bolt portion 68a and the fixing hole 66c. The damper abutment portion 68b is axially fixed in position by an end portion 68c on the outside in the vehicle width direction abutting on an inner lateral surface in the vehicle width direction of the lateral wall portion 66.

The damper abutment portion 68b fits in the hole portion 59a in the damper member 59 inside the recessed portion 56b to thereby be connected with the damper member 59.

The sprocket 58 has a disc shape and includes a tooth portion 58a on an outer peripheral portion thereof. The tooth portion 58a meshes with the power transmission member 33. The sprocket 58 further has a central hole 58b at a center thereof. The rear wheel axle 3a passes through the central hole 58b. The sprocket 58 has a plurality of mounting holes 58c around the central hole 58b. The bolt portion 68a is passed through the mounting hole 58c.

The bolt portions 68a are passed through the respective mounting holes 58c in the sprocket 58 and an inner lateral surface in the vehicle width direction of the sprocket 58 is brought into abutment with the seat portion 66b. A nut 69, which is fastened to an end portion of the bolt portion 68a, causes the sprocket 58 to be fixed to the seat portion 66b.

The lateral wall portion 66 of the sprocket support member 57 covers the outer lateral surface of the damper case 56 from the outside in the vehicle width direction and hides the recessed portions 56b and the damper member 59.

The lateral wall portion 66 extends further outwards in the radial direction than the outer periphery 56c of the damper case 56 does. The peripheral wall portion 67, which extends from the outer edge in the radial direction of the lateral wall portion 66 to the inside in the vehicle width direction toward the side of the hub main body 55, is located outside the outer periphery 56c of the damper case 56 in the radial direction and covers the outer periphery 56c from the outside in the radial direction. The peripheral wall portion 67 is an annular portion circling around the outer periphery 56c.

A bearing 70 and a retainer 71 are fitted in an inner peripheral portion of the support member-side axle hole 66a in the sprocket support member 57. The retainer 71 axially fixes the bearing 70.

The bearing 70 includes an inner race 70a, an outer race 70b, and a ball 70c. The inner race 70a is fixed to the side of the rear wheel axle 3a. The outer race 70b is fixed to the support member-side axle hole 66a. The ball 70c is disposed between the inner race 70a and the outer race 70b. The bearing 70 is an angular bearing that can bear load in the radial direction and the axial direction. The retainer 71 presses the outer race 70b from the outside in the vehicle width direction.

A first collar 72 is disposed between the wheel bearing 62 and the bearing 70 on the rear wheel axle 3a.

Additionally, a second collar 73 and a third collar 74 are disposed between the bearing 70 and an inner lateral surface of the arm portion 13a on the rear wheel axle 3a.

The first collar 72, the second collar 73, and the third collar 74 are each a tubular member fitted over the outer periphery of the rear wheel axle 3a.

The rear wheel axle 3a is inserted in each of axle holes 13b at rear end portions of the arm portions 13a on the right and left.

The rear wheel axle 3a includes a flange portion 3b on a first end thereof. The flange portion 3b depresses the arm portion 13a on a first side from the outside in the vehicle width direction. A nut (not illustrated) that depresses the arm portion 13a (not illustrated) on a second side from the outside in the vehicle width direction is fastened to a threaded portion on a second end of the rear wheel axle 3a. The fastening of the nut generates an axial force compressing the wheel bearing 64, the tube member 55a, the wheel bearing 62, the first collar 72, the bearing 70, the second collar 73, and the third collar 74 in the axial direction. The foregoing axial force causes the wheel bearing 64, the wheel bearing 62, and the bearing 70 to be fixed on the rear wheel axle 3a.

More specifically, the wheel bearing 62 is correctly positioned in the axial direction by the inner race 62a being clamped between the tube member 55a and the first collar 72.

The bearing 70 is correctly positioned in the axial direction by the inner race 70a being clamped between the first collar 72 and the second collar 73.

The sprocket support member 57, which is supported by the bearing 70, is correctly positioned in the axial direction via the bearing 70.

As illustrated in FIGS. 3 and 4, the resistance mechanism 80 is disposed between an inner periphery 67a of the peripheral wall portion 67 of the sprocket support member 57 and the outer periphery 56c of the damper case 56 of the hub 53.

FIG. 7 is an enlarged cross-sectional view of parts around the resistance mechanism 80 in FIG. 3.

Reference is made to FIGS. 3, 6, and 7. The resistance mechanism 80 includes a plurality of friction plates 81, an urging member 82, and a clip member 83. The urging member 82 brings the friction plates 81 into tight contact with each other. The clip member 83 restricts positions of the friction plates 81 and the urging member 82.

The friction plates 81 are disposed, one on top of another, in the axial direction of the hub 53, outside the outer periphery 56c of the damper case 56 and inside the inner periphery 67a of the peripheral wall portion 67 of the sprocket support member 57.

The friction plates 81 include a plurality of hub-side friction plates 84 and a plurality of sprocket-side friction plates 85. The hub-side friction plates 84 are supported by the damper case 56 of the hub 53. The sprocket-side friction plates 85 are supported by the peripheral wall portion 67 of the sprocket support member 57.

The sprocket-side friction plates 85 are each a ring having an inside diameter greater than an inside diameter of the outer periphery 56c of the damper case 56. The damper case 56 is passed through inner peripheral portions 85a of the sprocket-side friction plates 85.

A plurality of outer side tab portions 86 are disposed on outer peripheral portions of the sprocket-side friction plates 85. The outer side tab portions 86 protrude to the outside in the radial direction.

The outer side tab portions 86 are spaced apart from each other in the circumferential direction of the hub 53 on the outer peripheral portions of the sprocket-side friction plates 85. The outer side tab portions 86 each include a plurality of protrusions 86a. The protrusions 86a stand in a row in the circumferential direction of the hub 53.

The sprocket-side friction plates 85 are housed inside the peripheral wall portion 67 of the sprocket support member 57.

A plurality of inner peripheral side support portions 87 are formed on the inner periphery 67a of the peripheral wall portion 67. The outer side tab portions 86 of the sprocket-side friction plates 85 engage the inner peripheral side support portions 87. The inner peripheral side support portions 87 are spaced apart from each other in the circumferential direction of the hub 53 on the inner periphery 67a.

The inner peripheral side support portions 87 each include a plurality of grooves 87a. The grooves 87a extend in the vehicle width direction along the inner periphery 67a and open to the inside in the vehicle width direction. The protrusions 86a engage the grooves 87a.

The hub-side friction plates 84, together with the sprocket-side friction plates 85, are housed inside the peripheral wall portion 67 of the sprocket support member 57.

The hub-side friction plates 84 are each a ring having an inside diameter greater than the inside diameter of the outer periphery 56c of the damper case 56. The damper case 56 is passed through inner peripheral portions 84a of the hub-side friction plates 84.

A plurality of inner side tab portions 88 are disposed on the inner peripheral portions 84a of the hub-side friction plates 84. The inner side tab portions 88 protrude to the inside in the radial direction to thereby engage the outer peripheral side support portions 60 of the damper case 56.

The inner side tab portions 88 are spaced apart from each other in the circumferential direction of the hub 53 on the inner peripheral portions 84a of the hub-side friction plates 84. The inner side tab portions 88 each include a plurality of protrusions 88a. The protrusions 88a stand in a row in the circumferential direction of the hub 53. The protrusions 88a engage the grooves 60a.

The sprocket-side friction plates 85 and the hub-side friction plates 84, under a condition of being alternately placed one on top of another in the axial direction of the hub 53, are housed inside the peripheral wall portion 67 of the sprocket support member 57.

More specifically, a first one of the sprocket-side friction plates 85 is disposed on an inner surface side of the lateral wall portion 66 of the sprocket support member 57. The hub-side friction plates 84 and the sprocket-side friction plates 85 are then alternately juxtaposed so as to overlap the first one of the sprocket-side friction plates 85.

Of the friction plates 81, the friction plate disposed on the outermost in the vehicle width direction and the friction plate disposed on the innermost in the vehicle width direction are the sprocket-side friction plates 85. Specifically, the sprocket-side friction plates 85 are greater in number by one than the hub-side friction plates 84.

The sprocket-side friction plates 85 clamp the hub-side friction plate 84 from both sides in a thickness direction of the sprocket-side friction plates 85. The sprocket-side friction plates 85 are metal plates and the hub-side friction plate 84 is clamped by contact surfaces formed of metal. Lateral surface portions of the hub-side friction plate 84 clamped by the above-described contact surfaces of the sprocket-side friction plates 85 are provided with friction portions having a coefficient of friction greater than a coefficient of friction of the contact surfaces of the sprocket-side friction plates 85.

The hub-side friction plates 84, which engage the outer peripheral side support portions 60 of the damper case 56 via the inner side tab portions 88, rotate integrally with the damper case 56. Specifically, the hub-side friction plates 84 rotate integrally with the wheel 50.

The sprocket-side friction plates 85, which engage the inner peripheral side support portions 87 of the sprocket support member 57 via the outer side tab portions 86, rotate integrally with the sprocket support member 57.

Thus, when the sprocket support member 57 rotates relative to the wheel 50 (damper case 56), relative rotation occurs also between the sprocket-side friction plates 85 and the hub-side friction plates 84.

The clip member 83 is disposed at a position in the inner periphery 67a of the peripheral wall portion 67 inside in the vehicle width direction relative to the friction plates 81. The clip member 83 is a circlip and engages an engagement groove 67b which is formed in the inner periphery 67a. The clip member 83 removably engage the engagement groove 67b.

The clip member 83 has a ring shape and the damper case 56 is passed through an inner peripheral portion of the clip member 83.

The urging member 82 is disposed between the inner periphery 67a of the peripheral wall portion 67 and the outer periphery 56c of the damper case 56.

The urging member 82 is a spring that is disposed, in the inside of the peripheral wall portion 67, under a compressed condition between the sprocket-side friction plate 85 which is the friction plate 81 disposed on the innermost side in the vehicle width direction, and the clip member 83. In the embodiment, the urging member 82 is a coned disc spring. A ring-shaped washer 89 is disposed between the clip member 83 and the urging member 82.

The urging member 82 is ring-shaped and the damper case 56 is passed through an inner peripheral portion of the urging member 82.

The urging member 82 depresses the friction plates 81 toward the outside in the vehicle width direction to thereby bring the friction plates 81 into tight contact with each other in the axial direction of the hub 53. The friction plates 81 are compressed between the urging member 82 and the lateral wall portion 66. Replacing the urging member 82 with a type having a different spring constant allows the friction force generated in the friction plates 81 to be adjusted readily.

To mount the sprocket support member 57 on the wheel 50, a subassembly that assembles the sprocket-side friction plates 85, the hub-side friction plates 84, the urging member 82, the washer 89, and the clip member 83 with the sprocket support member 57 is prepared.

The subassembly is assembled with the outer periphery 56c of the damper case 56 such that the inner side tab portions 88 are inserted from the outside in the vehicle width direction in the outer peripheral side support portions 60 which open to the outside in the vehicle width direction.

Thus, the sprocket support member 57 and the resistance mechanism 80 can easily be mounted on the wheel 50.

When the subassembly is to be mounted on the wheel 50, the damper abutment portion 68b of the fixing bolt 68 for the sprocket support member 57 is also assembled in the hole portion 59a in the damper member 59.

The sprocket support member 57 is connected with the damper case 56 via the fixing bolts 68 and the damper members 59 and transmission of torque between the sprocket support member 57 and the wheel 50 is performed via the fixing bolts 68 and the damper members 59.

Additionally, the sprocket support member 57 is connected with the damper case 56 via the resistance mechanism 80 and transmission of torque between the sprocket support member 57 and the wheel 50 is performed also via the resistance mechanism 80.

When variation in torque between the sprocket support member 57 and the wheel 50 is small, such as when the motorcycle 1 runs at a constant speed, the sprocket support member 57 rotates integrally with the wheel 50.

When a large variation in torque occurs between the sprocket support member 57 and the wheel 50 due to, for example, acceleration and deceleration of the motorcycle 1 and shifting by the transmission, the sprocket support member 57 rotates relative to the wheel 50.

When the sprocket support member 57 rotates relative to the wheel 50, the damper members 59 are compressed between the damper abutment portions 68b and the recessed portions 56b in the circumferential direction of the wheel 50 and deformed. An amount of the relative rotation between the sprocket support member 57 and the wheel 50 corresponds to an amount of deformation of the damper member 59.

Through the foregoing, impact resulting from the variation in torque between the sprocket support member 57 and the wheel 50 can be absorbed by the deformation of the damper member 59, so that load acting on drive system parts, including the sprocket 58 and the power transmission member 33, can be reduced.

Additionally, when the sprocket support member 57 rotates relative to the wheel 50, relative rotation occurs between the sprocket-side friction plates 85 and the hub-side friction plates 84 of the resistance mechanism 80 and friction generated between the sprocket-side friction plates 85 and the hub-side friction plates 84 dampens the relative rotation between the sprocket support member 57 and the wheel 50.

Through the foregoing, impact resulting from the variation in torque between the sprocket support member 57 and the wheel 50 can be dampened by resistance through the friction in the resistance mechanism 80, so that load acting on drive system parts, including the sprocket 58 and the power transmission member 33, can be reduced.

The resistance mechanism 80 is disposed between the inner periphery 67a of the peripheral wall portion 67 of the sprocket support member 57 and the outer periphery 56c of the damper case 56. This configuration enhances a degree of freedom in selecting sizes, including diameters and thicknesses, of the sprocket-side friction plates 85 and the hub-side friction plates 84 and the numbers of sprocket-side friction plates 85 and hub-side friction plates 84. Thus, a degree of freedom is high in setting the damping force of the resistance mechanism.

Additionally, replacing the urging member 82 with a type having a different spring constant allows the friction force generated in the resistance mechanism 80 to be varied readily.

The sprocket support member 57 is correctly positioned in the axial direction of the hub 53 via the bearing 70 and the urging member 82 is supported by the peripheral wall portion 67 of the sprocket support member 57. Because of this configuration, the urging force generated by the urging member 82 is less likely to be affected by the load acting on the sprocket 58. The urging member 82 thus can appropriately urge the sprocket-side friction plates 85 and the hub-side friction plates 84, so that friction can effectively be generated.

As described above, according to the embodiment to which the present invention is applied, the motorcycle 1 includes the power transmission member 33 which transmits the power of the engine 11 as a power unit to the wheel 50 of the rear wheel 3, the sprocket 58 which is driven by the power transmission member 33, the sprocket support member 57 which supports the sprocket 58 and is connected with the wheel 50, the damper members 59 which are housed in the recessed portions 56b in the hub 53 of the wheel 50 and are disposed between the hub 53 and the sprocket support member 57, the damper members 59 being deformed through the relative rotation between the hub 53 and the sprocket support member 57, and the resistance mechanism 80 which dampens the relative rotation between the hub 53 and the sprocket support member 57. The sprocket support member 57 includes the peripheral wall portion 67 which covers the outer periphery 56c of the hub 53 from the outside in the radial direction. The resistance mechanism 80 is disposed between the inner periphery 67a of the peripheral wall portion 67 and the outer periphery 56c of the hub 53.

Through the foregoing configuration, because the resistance mechanism 80 is disposed between the inner periphery 67a of the peripheral wall portion 67 of the sprocket support member 57 and the outer periphery 56c of the hub 53, a degree of freedom in the shape and disposition of the resistance mechanism 80 is high, so that the degree of freedom in setting the damping force of the resistance mechanism 80 can be enhanced.

The resistance mechanism 80 includes the friction plates 81 which rotate relative to each other through the relative rotation between the hub 53 and the sprocket support member 57.

Through the foregoing configuration, the friction plates 81 can be disposed with a high degree of freedom between the inner periphery 67a of the peripheral wall portion 67 and the outer periphery 56c of the hub 53. Thus, the friction force of the friction plates 81 can readily be adjusted and the degree of freedom in setting the damping force of the resistance mechanism 80 can be enhanced.

The friction plates 81 include the hub-side friction plates 84 which are supported by the hub 53, and the sprocket-side friction plates 85 which are supported by the peripheral wall portion 67 of the sprocket support member 57.

Through the foregoing configuration, friction can be generated through the relative rotation between the hub-side friction plates 84 and the sprocket-side friction plates 85 and the damping force can effectively be generated.

Additionally, the hub-side friction plates 84 are supported by the outer peripheral side support portions 60 which are provided on the outer periphery 56c of the hub 53 and the sprocket-side friction plates 85 are supported by the inner peripheral side support portions 87 which are provided on the inner periphery 67a of the peripheral wall portion 67.

Through the foregoing configuration, the hub-side friction plates 84 and the sprocket-side friction plates 85 can be supported with a simple structure and the resistance mechanism 80 can be built into a compact configuration.

The sprocket-side friction plates 85 and the hub-side friction plates 84 are alternately juxtaposed and the sprocket-side friction plates 85 are greater in number by one than the hub-side friction plates 84.

Through the foregoing configuration, the sprocket-side friction plates 85 can clamp the hub-side friction plate 84, so that friction can effectively be generated.

The hub-side friction plates 84 each have a ring shape fitting in the outer periphery 56c of the hub 53 and each include the inner side tab portions 88 which protrude from the inner periphery thereof to the inside in the radial direction. The outer peripheral side support portions 60 each have the grooves 60a which extend in the vehicle width direction. The inner side tab portions 88 engage the grooves 60a and the grooves 60a are open toward the outside in the vehicle width direction.

Through the foregoing configuration, the inner side tab portions 88 on the inner periphery of the hub-side friction plates 84 can be engaged with the grooves 60a in the outer periphery 56c of the hub 53 from the outside in the vehicle width direction, so that the hub-side friction plates 84 can easily be assembled.

The hub-side friction plates 84 each have a ring shape fitting in the outer periphery 56c of the hub 53 and each include the inner side tab portions 88 which protrude from the inner peripheral portion 84a of the hub-side friction plates 84 to the inside in the radial direction. The outer peripheral side support portions 60 each have the grooves 60a, which the inner side tab portions 88 engage. The recessed portions 56b are spaced apart from each other in the circumferential direction of the hub 53 on the inside in the radial direction relative to the outer periphery 56c of the hub 53. The grooves 60a are disposed at positions between respective pairs of the recessed portions 56b in the circumferential direction of the hub 53.

Through the foregoing configuration, the grooves 60a, which the inner side tab portions 88 engage, are less likely to hinder disposition of the recessed portions 56b. This feature allows the recessed portions 56b to be enlarged, so that the damper members can have an increased volume. The outer peripheral side support portions 60 can be disposed to have a small size in the radial direction of the hub 53 and the hub 53 can be prevented from being built larger.

The urging member 82, which urges the friction plates 81 so as to bring the friction plates 81 into tight contact with each other in the axial direction of the hub 53, is disposed between the inner periphery 67a of the peripheral wall portion 67 and the outer periphery 56c of the hub 53.

Through the foregoing configuration, the urging member 82 can be provided in a small amount of space between the inner periphery 67a of the peripheral wall portion 67 and the outer periphery 56c of the hub 53. Additionally, adjusting the setting of the urging member 82 allows the damping force generated through friction can easily be adjusted.

Furthermore, the urging member 82 is compressed between the clip member 83 which removably engages the inner periphery 67a of the peripheral wall portion 67, and the friction plates 81.

Through the foregoing configuration, the removal of the clip member 83 provides easy access to the friction plates 81 and the urging member 82 and facilitates adjustments of the damping force. In addition, the friction plates 81 and the urging member 82 can be held by the sprocket support member 57 with the clip member 83 which engages the sprocket support member 57, so that the resistance mechanism 80 can easily be assembled with the hub 53.

Additionally, the saddle riding vehicle further includes the fixing bolts 68 which fix the sprocket 58 to the sprocket support member 57. The fixing bolts 68 each include the bolt portion 68a which protrudes from the sprocket support member 57 to the outside in the vehicle width direction to thereby support the sprocket 58, and the damper abutment portion 68b which extends into the inside in the recessed portion 56b and abuts on the damper member 59.

Through the foregoing configuration, because the fixing bolts 68, which support the sprocket 58, include the damper abutment portions 68b, the damper members 59 can be deformed by the fixing bolts 68. This simplifies the structure.

It should be understood that the foregoing embodiment represents only one mode to which the present invention is applied and that the present invention is not limited to the foregoing embodiment.

Although the hub 53 has been described in the above embodiment as including the hub main body 55 and the damper case 56 which is fixed to the hub main body 55, the hub 53 may include the hub main body 55 integrated with the damper case 56.

Although the above-described embodiment exemplifies the motorcycle 1 as the saddle riding vehicle, the present invention is not limited thereto and can be applied to a three-wheeled saddle riding vehicle including two front wheels or two rear wheels or a saddle riding vehicle including four or more wheels.

DESCRIPTION OF REFERENCE SYMBOLS

1 Motorcycle (saddle riding vehicle)
3 Rear wheel (drive wheel)
11 Engine (power unit)
33 Power transmission member
50 Wheel
53 Hub
56b Recessed portion
56c Outer periphery
57 Sprocket support member
58 Sprocket
59 Damper member
60 Outer peripheral side support portion
60a Groove
67 Peripheral wall portion (extension portion)
67a Inner periphery
68 Fixing bolt
68a Bolt portion
68b Damper abutment portion
80 Resistance mechanism
81 Friction plate
82 Urging member
83 Clip member
84 Hub-side friction plate
84a Inner peripheral portion
85 Sprocket-side friction plate
87 Inner peripheral side support portion
88 Inner side tab portion

The invention claimed is:

1. A saddle riding vehicle comprising:
 a power transmission member that transmits a power of a power unit to a wheel of a drive wheel;
 a sprocket driven by the power transmission member;
 a sprocket support member that supports the sprocket and that is connected with the wheel;
 a damper member that is housed in at least one recessed portion in a hub of the wheel and disposed between the hub and the sprocket support member, the damper member being deformed through a relative rotation between the hub and the sprocket support member; and a resistance mechanism that dampens the relative rotation between the hub and the sprocket support member, wherein the sprocket support member includes an extension portion that covers an outer periphery of the hub from an outside in a radial direction, the resistance mechanism is disposed between an inner periphery of the extension portion and the outer periphery of the hub, the resistance mechanism includes a plurality of friction plates that rotate relative to each other through the relative rotation between the hub and the sprocket support member, the plurality of friction plates include hub-side friction plates supported by the hub, and sprocket-side friction plates supported by the extension portion of the sprocket support member, the hub-side friction plates are supported by outer peripheral side support portions that are provided on the outer periphery of the hub, and the sprocket-side friction plates are supported by inner peripheral side support portions that are provided on the inner periphery of the extension portion.

2. The saddle riding vehicle according to claim 1, wherein the sprocket-side friction plates and the hub-side friction plates are alternately juxtaposed and the sprocket-side friction plates are greater in number by one than the hub-side friction plates.

3. The saddle riding vehicle according to claim 1, wherein the hub-side friction plates each have a ring shape fitting in the outer periphery of the hub and each include an inner side tab portion that protrudes from inner peripheral portions of the hub-side friction plates to an inside in the radial direction, the outer peripheral side support portions each have a groove that extends in a vehicle width direction and the inner side tab portion engages the groove, and the groove is open toward the outside in the vehicle width direction.

4. The saddle riding vehicle according to claim 1, wherein the hub-side friction plates each have a ring shape fitting in the outer periphery of the hub and each include inner side tab portions that protrude from inner peripheral portions of the hub-side friction plates to an inside in the radial direction, the outer peripheral side support portions each have grooves, the grooves being engaged with the inner side tab portions, the at least one recessed portion includes a plurality of recessed portions that are spaced apart from each other in a circumferential direction of the hub on the inside in the radial direction relative to the outer periphery of the hub, and the grooves are disposed at positions between respective pairs of the recessed portions in the circumferential direction of the hub.

5. The saddle riding vehicle according to claim 1, further comprising:

an urging member disposed between the inner periphery of the extension portion and the outer periphery of the hub, the urging member urging the friction plates so as to bring the friction plates into tight contact with each other in an axial direction of the hub.

6. The saddle riding vehicle according to claim 5, wherein the urging member is compressed between a clip member that removably engages the inner periphery of the extension portion and the friction plates.

7. The saddle riding vehicle according to claim 1, further comprising:

a fixing bolt that fixes the sprocket to the sprocket support member, wherein the fixing bolt includes a bolt portion that protrudes from the sprocket support member to the outside in the vehicle width direction to thereby support the sprocket and a damper abutment portion that extends into an inside in the recessed portion and abuts on the damper member.

8. A saddle riding vehicle comprising:

a power transmission member that transmits a power of a power unit to a wheel of a drive wheel;

a sprocket driven by the power transmission member;

a sprocket support member that supports the sprocket and that is connected with the wheel;

a damper member that is housed in at least one recessed portion in a hub of the wheel and disposed between the hub and the sprocket support member, the damper member being deformed through a relative rotation between the hub and the sprocket support member; and a resistance mechanism that dampens the relative rotation between the hub and the sprocket support member, wherein the sprocket support member includes an extension portion that covers an outer periphery of the hub from an outside in a radial direction, the resistance mechanism is disposed between an inner periphery of the extension portion and the outer periphery of the hub, the resistance mechanism includes a plurality of friction plates that rotate relative to each other through the relative rotation between the hub and the sprocket support member, the saddle riding vehicle further comprises:

an urging member disposed between the inner periphery of the extension portion and the outer periphery of the hub, the urging member urging the friction plates so as to bring the friction plates into tight contact with each other in an axial direction of the hub.

* * * * *